US012627484B2

(12) United States Patent
Cambou et al.

(10) Patent No.: US 12,627,484 B2
(45) Date of Patent: May 12, 2026

(54) BIOMETRY WITH CHALLENGE RESPONSE PAIR MECHANISM

(71) Applicants: Arizona Board of Regents on Behalf of Northern Arizona University, Flagstaff, AZ (US); Brown University, Providence, RI (US)

(72) Inventors: Bertrand F Cambou, Flagstaff, AZ (US); Jeffrey Hoffstein, Providence, RI (US)

(73) Assignees: ARIZONA BOARD OF REGENTS ON BEHALF OF NORTHERN ARIZONA UNIVERSITY, Flagstaff, AZ (US); BROWN UNIVERSITY, Providence, RI (US)

( * ) Notice: Subject to any disclaimer, the term of this patent is extended or adjusted under 35 U.S.C. 154(b) by 59 days.

(21) Appl. No.: 18/638,412

(22) Filed: Apr. 17, 2024

(65) Prior Publication Data

US 2024/0348436 A1 Oct. 17, 2024

Related U.S. Application Data

(63) Continuation-in-part of application No. 18/397,975, filed on Dec. 27, 2023.

(Continued)

(51) Int. Cl.
*H04L 9/08* (2006.01)
*H04L 9/32* (2006.01)

(52) U.S. Cl.
CPC .......... *H04L 9/0869* (2013.01); *H04L 9/3231* (2013.01); *H04L 9/3271* (2013.01)

(58) Field of Classification Search
CPC ... H04L 9/3278; H04L 9/3231; H04L 9/3239; H04L 9/0866; H04L 9/3226
See application file for complete search history.

(56) References Cited

U.S. PATENT DOCUMENTS 6,219,439 B1   4/2001   Burger
7,769,206 B2   8/2010   Monden
(Continued)

FOREIGN PATENT DOCUMENTS

CN      114065167      2/2022
EP       2536061      12/2012
(Continued)

OTHER PUBLICATIONS

P. Phillips, P. Rauss, S. Der; FERET (Face Recognition Technology) Recognition Algorithms Development and Test Results; Army Research Laboratory, ARL-TR-995, Oct. 1996.
(Continued)

*Primary Examiner* — Mohammed Waliullah
(74) *Attorney, Agent, or Firm* — Quarles & Brady LLP

(57) ABSTRACT

Methods for the encoding an encryption key for secure storage are disclosed. The methods rely on the use of unclonable, one-way functions, such as images of biological objects that may be measured according to challenges to result in responses. A biometric print of a biological object is measured with a set of n challenges resulting in n responses. The responses are an ordered sequence, with each response having a fixed position in the sequence. A key is generated of bit length n. A subset of m responses in the full set of n responses is selected, where the selected responses correspond to positions of is in the key. The response subset is stored. The key is then used, and deleted. A party wishing to re-generate the key generates the same set of challenges, measures the same biological object with the challenges a second time, and generates a second set of n responses. Responses in the stored subset of m responses will match responses in the second set of n responses at certain positions in second set of n responses. These matching positions correspond to 1s in the key. The non-matching positions
(Continued)

Challenges C ⟶ Biometric Print ⟶ Responses R=f(C)

Similarity with hash functions:
* One way:        Hard to uncover C from R
* Weak Collisions: Different C's generate different R's
                  Different R's are from different C's
  [this is true when the differences are large enough]
Contrasts with hash functions:
* Unclonable:     Assuming enough accuracy in the prints
* Unique:         $R_1$ for print 1 ≠ $R_2$ for print 2
* Stochasticity:  Presence of random effects
* Sensitive:      Subject to environmental effects
* Imperfect:      Subject to aging and drifts correspond to 0s. Thus, comparison between the response sets recovers the key.

13 Claims, 11 Drawing Sheets

Related U.S. Application Data

(60) Provisional application No. 63/459,933, filed on Apr. 17, 2023, provisional application No. 63/459,938, filed on Apr. 17, 2023.

(56) References Cited

U.S. PATENT DOCUMENTS

| | | | | |
|---|---|---|---|---|
| 8,745,405 | B2 * | 6/2014 | Pizano | G06F 21/32 |
| | | | | 713/186 |
| 10,503,890 | B2 | 12/2019 | Cambou et al. | |
| 11,394,706 | B2 | 7/2022 | Lin et al. | |
| 11,411,750 | B2 | 8/2022 | Kannan et al. | |
| 12,184,797 | B2 * | 12/2024 | Cambou | H04L 9/3268 |
| 2007/0083918 | A1 * | 4/2007 | Pearce | H04L 63/0428 |
| | | | | 726/5 |
| 2007/0291106 | A1 * | 12/2007 | Kenrick | H04M 3/42017 |
| | | | | 348/E7.081 |
| 2007/0291776 | A1 * | 12/2007 | Kenrick | H04M 3/42093 |
| | | | | 348/E7.081 |
| 2008/0112596 | A1 * | 5/2008 | Rhoads | G06T 1/005 |
| | | | | 382/115 |
| 2011/0026781 | A1 | 2/2011 | Osadchy et al. | |
| 2011/0055585 | A1 * | 3/2011 | Lee | H04L 9/3226 |
| | | | | 713/183 |
| 2011/0138192 | A1 * | 6/2011 | Kocher | H04L 9/003 |
| | | | | 713/189 |
| 2012/0014520 | A1 | 1/2012 | Baughman | |
| 2013/0148868 | A1 | 6/2013 | Troncoso Pastoriza et al. | |
| 2019/0273612 | A1 * | 9/2019 | Sinha | H04L 69/28 |
| 2021/0036875 | A1 | 2/2021 | Kim et al. | |
| 2022/0188393 | A1 | 6/2022 | Forte et al. | |
| 2023/0045288 | A1 | 2/2023 | Cambou et al. | |
| 2024/0214224 | A1 | 6/2024 | Cambou et al. | |

FOREIGN PATENT DOCUMENTS

| | | | |
|---|---|---|---|
| WO | 2014131557 | 9/2014 | |
| WO | 2015075664 | 5/2015 | |
| WO | WO-2022122130 A1 * | 6/2022 | ........... H04L 9/3231 |

OTHER PUBLICATIONS

I. Adjabi et al., "Past, Present, and Future of Face Recognition: A Review; Electronics," DOI: 10/3390/electronics9081188, Jul. 2020.

M. Blatt et al., Optimized Homomorphic Encryption Solution for Secure Genome-Wide Association Studies, BMC Med Genomics, doi: 10.1186/s12920-020-0719-9, Jul. 2020.

B. Chen et al., "Fourier-Transform-Based Surface Measurement and Reconstruction of Human Face Using the Projection of Monochromatic Structured Light," Sensors, 21(7), 2529; https://doi.org/10.3390/s21072529, 2021.

M. Faundez-Zanuy et al., "Face Recognition in Transformed Domain," IEEE CCST, doi: 10.1109/CCST.2003.1297575, Oct. 2003.

L. Feng et al., "Image Recognition and Encryption Algorithm Based on Artificial Neural Network and Multidimensional Chaotic Sequence," Comput Intell Neuroscience, doi: 10.1155/2022/9576184, Aug. 2022.

R. Jafri et al., "A Survey of Face Recognition Techniques," Journal of Information Processing Systems, DOI 10.3745/JIPS.2009.5.2.041, Jun. 2009.

A. Khan et al., "Secure Facial Recognition in The Encrypted Domain Using a Local Ternary Pattern Approach," Journal of Information Security and Applications, vol. 59, https://doi.org/10.1016/j.jisa.2021.102810, Jun. 2021.

L. Li et al., "A Review of Face Recognition Technology," IEEE Access, DOI: 10.1109/ACCESS 2020.30111028, Aug. 2020.

H. Lu et al., Face Recognition with Biometric Encryption for Privacy-Enhancing Self-Exclusion, International Conference on Digital Signal Processing, DOI:10.1109/ICDSP.2009.5201257, Aug. 2009.

A. Marrugo et al., "Fourier Transform Profilometry in LabView," http://dx.doi.org/10.5772/intechopen.78548, Nov. 2018.

P. Phillips et a., "FERET (Face Recognition Technology) Recognition Algorithms Development and Test Results," Army Research Laboratory, ARL-TR-995, Oct. 1996.

P.A. Tresadern et al., "Combining Local and Global Shape Models for Deformable Object Matching," BMVC 2009: 1-12.

P.A. Tresadern et al., "Face Alignment Models," Handbook of Face Recognition 2011: 109-135.

H. Zhi et al., "Face Recognition Based on Generic Algorithm," Journal Vis. Commun. Image R., https//doi.org/10.1016/jvcir.2018.12.012, 2018.

* cited by examiner

BIOMETRY WITH CHALLENGE RESPONSE PAIR MECHANISM

CROSS-REFERENCE TO RELATED APPLICATIONS

The present application claims priority to U.S. Provisional Application 63/459,933 entitled "Biometry With Challenge-Response-Pair Mechanism," filed Apr. 17, 2024, the entirety of which is incorporated herein by reference. The present application also claims priority to U.S. Provisional Application 63/459,938 entitled "Protocols with Noisy Response-Based Cryptographic Subkeys," filed on Apr. 17, 2024, the entirety of which is incorporated herein by reference. The present application is a continuation-in-part of U.S. patent application Ser. No. 18/397,975, entitled "Pseudo-Homomorphic Authentication of Users with Biometry," filed Dec. 27, 2023, which is incorporated by reference in its entirety.

STATEMENT REGARDING FEDERALLY-SPONSORED RESEARCH

Not Applicable.

BACKGROUND

Central organizations managing networks of computing devices, such as private enterprises, financial organizations, financial transaction networks, governments, and various other commercial entities face ongoing challenges by malicious actors seeking to gain access to secure systems with sensitive information. Such entities generally implement stringent methods to prevent malicious use and to ensure that only authorized users have access to sensitive systems. Examples include requests to users and client devices to frequently change passwords, supply tokens generated by multi-factor authentication and mandatory software updates. Users of such systems are accustomed to handle such mandatory requests in a routine manner, without verifying that the server managing security is legitimate.

Many methods have been suggested for the generation of session keys for encrypting communications between remote users (also described herein as users, clients and/or terminal devices) and central devices (also described herein as servers). Once such method is disclosed in U.S. patent application Ser. No. 17/879,697, entitled, "PUF-Protected Pseudo-Homomorphic Methods to Generate Session Keys," filed on Aug. 2, 2022 and published as 2023/0045288 on Feb. 9, 2023. That application, which is incorporated herein by reference in its entirety, discusses systems and methods for using physical unclonable functions (PUFs) to enable a user to authenticate a server, or a server to authenticate a user, and to generate session keys to enable authenticated communication between a client (user) and server. In one embodiment described in that application, the generation of session keys, initiated by client devices, is based on the use of PUFs embedded in the server. During an initial setup, the client device selects a set of passwords and a set of random numbers to hash the passwords multiple times. The server uses the resulting stream as a set of challenges to generate a set of responses from the PUF, which are stored as reference. To generate a session key, the client device picks a new set of random numbers which are smaller than the initial set of random numbers, to hash its password multiple times; the resulting messages are sent to the server. Using its PUF and the initial responses, the server can find the differences between both random numbers which are used to generate a shared session key. This method is pseudo-homomorphic because the computations never disclose the original passwords. Without the PUF, it is not possible to analyze the information and generate shared keys.

U.S. Pat. No. 10,503,890, entitled "Authentication of Images Extracted from Unclonable Objects," filed as Ser. No. 15/434,967 on Feb. 16, 2017 and published as 2017/0235938 on Aug. 17, 2017, describes how an unclonable and unique physical object, which may be a biological object, can be used for authentication using a CRP mechanism quite similar to the way physical unclonable functions (PUFs) are operating. That patent and publication are incorporated herein by reference in its entirety. According to that disclosure, the responses generated from the image of the unclonable object are then compared with the responses generated from the image kept as references. The CRP mechanism described in this publication is usable with any image of an unclonable object, including biological objects, such as images of human faces, irises, retinal vasculature and fingerprints.

What is common to these previously disclosed methods is the use of physical objects as one-way functions capable of generating responses to challenges, similar to cryptographic hash functions, but with certain improvements. In the case of PUFs, the challenges are generally specifications for measurement parameters of physical properties of the PUF. In the case of PUF arrays, the challenges may be sets of addresses of individual PUF elements that are to be measured, and conditions for measurement. Thus, the challenges specify how the PUF is to be measured, and the responses are physical characteristics of the PUF devices that are measured. In the case of a physical object, which may include a biological object, the challenges again specify measurement conditions. For example, image data may be taken of a biological object (like a finger print or a retina), and the challenges may specify addresses of locations in x and y within the image to measure variations in color or light intensity in the image. Another example usable with images of human faces is generating challenges that specify landmark facial features, and coordinates within an x-y coordinate space. The responses to these challenges may be the distance from a specified coordinate to a facial feature.

So generally, the challenges specify measurement conditions and parameters, and the responses are data that result from the measurements. The image data of a biological object is one example of a biometric print. As used herein, a biometric print is some set of data reflecting an accurate physical measurement of biological object. One example of a biometric print would be processed or unprocessed image data of a biological object, such as retinal vasculature or a fingerprint. The biometric print may result from rotating and scaling such image data such that it fits on and is in a fixed and known orientation with respect to a standard coordinate system. For example, when a human face and its features are used as the biological CRP mechanism, part of the biometric print generation process will be to recognize certain features (e.g., pupils), and use the distance and angle between those features to rotate and scale the image data to a standard, predetermined size and orientation. This enables future images of the same face to be accurately compared to previous images.

As stated, physical CRP generators share some properties with hash functions and other one-way functions, in which the challenges C are the input data, and the responses R the output. As with hash functions, for each challenge there is one response, such that each challenge-response-pair is then unique. FIG. 1 summarizes the similarities and differences between CRP mechanisms based on biometric prints and hash functions. As shown in FIG. 1, the challenges "C" are the input parameters to the one-way function; the responses "R" are the output parameters, with C being provided to the physical object (or data reflecting its response) according to $R=f(C)$. The challenges are a set of instructions that may be thought of as measurement parameters, conditions or other stimulus being provided to the physical object (e.g., the PUF) to elicit the response. For example, if the object has some appreciable area, or is addressable in some way, the challenges may identify some portion or portions of the unclonable object (e.g., by addresses) needed to generate the responses. The challenges may also be measurement conditions for a biometric print. The features of such schemes include the following, One-way function—the knowledge of the responses R should not disclose the challenges C.

Weak collisions (most of the cases).

Two different challenges should result in two different responses.

Two significantly different responses must be generated from different challenges.

It will be appreciated that these features are also common to mathematical functions, such as cryptographic hash functions, which are also one-way functions. Physical objects differ in important ways from cryptographic hash functions however. Some features of unclonable physical objects that may be contrasted against hash functions include:

Unclonability—Each object (the function generator) is considered as unclonable, which means that responses cannot be predicted from challenges without possession of the object.

Uniqueness—The object considered here is unique, meaning that for a given challenge C, each object will produce a different response R.

Stochasticity—The measurements through physical sensing methods of the unclonable objects are never the same. For example, taking image data of a human face will always introduce some noise and randomness to the data. Certain levels of randomness must be expected.

Sensitivity—The shape of the objects and their measurements can vary in a rather deterministic way with environmental effects such as temperature and humidity. Environmental lighting and shading can impact image data taken of the same biological object at different times.

Imperfection—Unclonable objects are constantly evolving and drifting due to aging and unexpected events damaging them. This is true of physical objects like PUFs as well has biological objects that age or become damaged over time. A photograph of a person's face at 20 will look significantly different than one taken at 40.

There have been non-prior art systems invented by the instant inventors that make use of biological objects and biometric prints as CRP generators to generator cryptographic keys. In these systems, security is enhanced because, rather than storing a key for authentication, it is enough to store the challenges and to have access to the physical object that generates the responses. The responses are the keys and they are recovered through the biometric images and their challenges.

Some of these systems are disclosed in as-yet unpublished U.S. patent application Ser. No. 18/397,975, filed on Dec. 27, 2023, entitled "Psuedo-homomorphic Authentication of Users with Biometry". In the aforementioned system, biometric prints (e.g., physical measurement data such as processed or unprocessed image data of finger prints, palms, facial features, retinal vasculature and other vein patterns, iris appearance, and/or image data regarding any of the aforementioned, combinations thereof, and/or image data regarding body gait or infrared images of body parts) are used as CRP generation mechanisms.

This background system includes an initial, pre-enrollment, setup step. The goal of the pre-enrollment step is to gather sufficient information to enable the extraction of responses from a biological object (e.g., image data) from a set of challenges (e.g., measurement instructions). Pre-enrollment generates a stored biometric print, that is, a set of data accurately reflecting an unclonable biological object. An example of a stored biometric print would include a processed or unprocessed digital image of a biological object. A stored biometric print would also generally include information about the measurement conditions of generation of the print, such as time and date, illumination conditions (e.g., average radiance or irradiance of the object that generated the print), magnification, illumination spectrum, and geometrical information, such as the position of features in the print relative to some reference axis. In these embodiments, the stored biological print contains sufficient detail to generate responses to whatever challenges will be provided.

Preferably, there is no stored image data, but instead, the pre-enrollment process elicits and stores information usable to take real-time measurement data of a biological object during an authentication cycles. Such data would include data sufficient to establish standard reference measurement conditions from which responses to challenges can be generated. By way of example, in the case where the biological object is a finger print, the pre-enrollment data will include information sufficient to orient a fingerprint image to a reference axis and to scale it to a standard scale. With such data, any image of the same fingerprint (biological object) can be transformed (i.e., rotated and scaled) to a baseline, reference orientation and scaled so that challenge instructions (e.g., locations on the print to be measured) can be consistently applied and responses can be repeatably elicited to the same challenges. This sort of pre-enrollment/calibration process may be applied to the methods described in this disclosure below.

After pre-enrollment, there is an enrollment procedure. During the enrollment step, a centralized device (e.g., a server) selects a set of passwords and a set of random numbers associated with each password. These two sets are used to generate an initial data stream with pseudo-homomorphic computations (by, e.g., iteratively hashing each password a number of times equal to its corresponding associated random number, and then combining the resulting hashed numbers in some fashion). The initial data stream represents or can be parsed or interpreted to represent instructions setting forth conditions of measurements to be taken of a physical object (i.e., challenges). The terminal device (i.e., a client) receives the data stream, applies the challenges (i.e., measures the physical object, a contemporaneously generated biometric print of the object or a stored biometric print) in accordance with the challenge instructions, and generates a set of responses from this initial data stream.

During an authentication cycle, the centralized device (server) generates a new set of random numbers associated with the set of passwords. Each of the new set of random numbers is smaller than the random number corresponding to the password that was generated during the enrollment step. The centralized element performs pseudo-homomorphic computations (e.g., subjects each password to a hashing operation a number of times equal to the second random number) to generate a second data stream and a session key. With a CRP mechanism (e.g., the ability to take and analyze biometric prints to generate responses), the terminal device independently uncovers the same shared session key from the second data stream and the responses from the initial setup.

The session key, once recovered by the terminal device may be used for authentication and/or encrypted communications between the central and terminal devices. It will be noticed here that the methods described above do not require the transmittal of biometric data between the terminal and central devices. Biometric data (e.g., biometric prints) are never stored at the central device (i.e., the server), and thus, are never at risk of unauthorized access through the central device. Indeed, detailed biometric data (like biometric prints) need never be stored long-term at the terminal device. While biometric data must be taken and measured during pre-enrollment, enrollment, and authentication, that data can (and preferably is) deleted after those cycles.

This system has certain advantages, primarily, that it does not require the storage of sensitive biological information. It is, however, amenable to improvement. In the following disclosure, these concepts are developed and expanded upon in additional inventive systems to achieve yet greater advantages. In the inventive systems that follow, improvements are introduced that are more resistant to error mechanisms inherent in the use of biological objects as CRP mechanisms. Additionally, in contrast to the biological object based systems just described, the systems of the present invention are much less computationally intensive, in that they do not require multiple iterative hashing steps.

BRIEF SUMMARY

Embodiments of the invention are directed to a systems and methods to replace or augment image recognition techniques with challenge-response-pair (CRP) mechanisms for secure key generation and exchange, while never storing any personal biometric information. The input parameters, the "challenges", are instructions generated from random numbers, while the output parameter, the "responses" are generated from the challenges with CRP mechanisms applied to unclonable physical objects, such as PUFs or biological objects, or data representations thereof such as biometric images. The inventive protocols incorporate sequences of n challenges, which generate, through biometric-based CRP mechanisms, sequences of n responses. Inventive embodiments include several variations of key exchange protocols that are based on comparing the original sequences of responses resulting from CRP mechanisms with sequences of responses that are modified by the keys that are exchanged.

For example, in one non-limiting example, a cryptographic key K of n bits randomly generated. As a binary number, K will be an ordered sequence of 1s and 0s, having m 1s and n−m 0s. A subset of responses is selected in the set of n responses, where the selected responses are those responses in the positions of the sequence corresponding to the positions of 1s in K. For example, assume that there are three responses R1, R2 and R3. Assume that K is 101. The subset of responses selected is R1 R3. Thus, subsets are generated by ignoring the responses positioned in entries of the key K equal to 0, and keeping the responses positioned in entries equal to 1. The recovery of the key K is possible when both the n responses (the selected subset) and the computed subset of m responses are known. In this example, the receiving party recovers the key K by recognizing the relative position of the subset of m responses among the initial sequence of n responses. Other embodiments expand on these protocols to cases including multi-factor authentication (MFA), peer to peer key exchange, access control for secured environments (e.g., bank ATMs or secure buildings), and other applications.

In one embodiment, an inventive system is directed to a server-client arrangement for generating a matching pair of cryptographic keys. The keys, once recovered by both devices, are usable for typical cryptographic functions such as encrypting and decrypting other keys or files for storage, or for encrypting communications for transfer between the devices. The keys may also be used for applying and authenticating digital signatures.

In this arrangement, an embodying method for generating and sharing a cryptographic key between a client and a server device includes an enrollment and key exchange procedure. In the enrollment procedure a sequence of random seeds is generated. A first ordered sequence of n challenges specifying measurement instructions for a biometric print is derived from the seeds. A first biometric print of biological object is generated and measured in accordance with the first ordered sequence of n challenges. The result of this process is a first ordered sequence of n responses. The seeds are stored at each of the client and server devices, and the ordered sequence of n responses is stored at the server device.

A mask may optionally be generated to exclude certain challenge-response pairs from further use. This may be useful if a particular challenge elicits a noisy or variable response, that is, if a particular challenge response shows measurement to measurement variability above some predetermined threshold. In certain optional embodiments, during enrollment, a superset of challenges is generated (e.g., 512), repeated measurements on the biometric print or biological object are performed for each challenge, and then the noisiest 256 CRPs are masked from further use. The masks are stored at both client and server for use during the key exchange procedure, such that both devices ignore challenges corresponding to noisy responses.

In a key generation procedure, the stored seeds are used again to derive the same first ordered sequence of n challenges. A second biometric print (which may be an electronic image of a biological object) is then made. The second biometric print is measured in accordance with the ordered sequence of n challenge instructions resulting in a second ordered sequence of n responses. A binary first key K is then randomly generated. K is preferably of bit length n. Within the second set of n responses, those responses are selected having a position in the sequence corresponding to the positions of a first binary symbol in the first key, resulting in a subset m responses. For example, if the second set of responses is R'1, R'2, R'3 and K is 101, responses R'1, R'3 are selected. These m responses are sent to the server. Each of these m responses in the subset is compared to each response in the first ordered sequence of n responses (which was previously stored during enrollment) to determine matches. The server then generates its own copy of K, which is a second binary key of n bit length, by determining positions of responses in the first ordered sequence of n responses (the previously stored set) that match responses in the subset of m responses. For the matching responses, the server assigns the first binary symbol (e.g., 1) to those positions. The server assigns a second binary symbol (e.g., 0) to the remaining positions.

The result of this process is that both client and server have K, and recovery was made possible with the only information shared between the devices after enrollment (i.e., over an unsecure channel) being the subset of m responses corresponding to the 1 positions in K. No biometric information is shared or stored.

The systems and methods of the present invention have certain advantages. Unlike existing protocols that are generating keys from CRP mechanisms, the ones described in this disclosure can operate with bit error rates (BERs) affecting the responses as high as 20%, without the need to apply additional error correcting codes (ECCs). This is advantageous because of the stochasticity, measurement sensitivity, and aging/drift problems inherent with physical object-based CRP mechanisms, and in particular, biological CRP mechanisms. The described protocols work well in hostile and noisy environments, and are highly resistant to jamming. Additionally, the noise insensitivity of these methods allows noise to be intentionally injected into the shared response subsets to further mask information from attackers.

Additionally, while biometric-based CRP mechanisms should have low collisions, there is no expectation of zero collision. Different challenges should generate different responses, and different responses should be generated by different challenges, however, unlike what occurs in a mathematical hash function, small changes in the challenges could generate only small changes in the responses. In the embodiments described in this disclosure, the acceptable response-to-response bit error rates (BERs) could be as much as 20%. To quantify CRP mechanisms, two parameters are important: the false reject rates (FRRs) that are caused by poorly reliable mechanisms; and the false acceptance rates (FARs) that are caused by weak mechanisms having a small number of possible CRPs, i.e., low entropy. The inventive embodiments described herein are capable of handling CRP mechanisms with high FRRs, high FARs, and high levels of collisions.

Additionally, while the exemplary methods and arrangements below are described as arrangements for key generation for encryption, secure storage, and communication, other applications are possible. It will be recognized that the noise insensitivity of these methods is directly applicable to image recognition systems generally. Other use cases will be evident to the person of ordinary skill.

The above features and advantages of the present invention will be better understood from the following detailed description taken in conjunction with the accompanying drawings.

BRIEF DESCRIPTION OF THE DRAWINGS

The drawings described herein constitute part of this specification and includes example embodiments of the present invention which may be embodied in various forms. It is to be understood that in some instances, various aspects of the invention may be shown exaggerated or enlarged to facilitate an understanding of the invention. Therefore, drawings may not be to scale.

DETAILED DESCRIPTION

Figure 1:
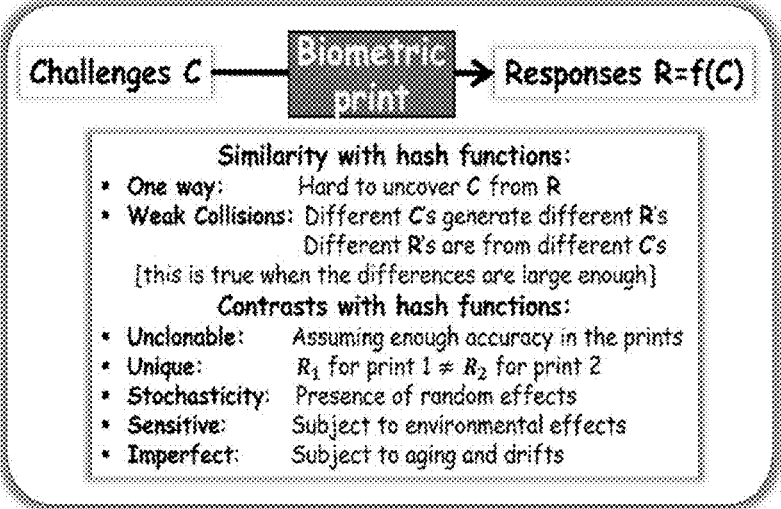
FIG. 1 conceptually depicts the generation of challenge-response pairs (CRP) with physical objects and illustrates similarities and differences between physical CRP mechanisms and mathematical one-way functions.

The described features, advantages, and characteristics may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments.

Reference throughout this specification to "one embodiment," "an embodiment," or similar language means that a particular feature, structure, or characteristic described in connection with the embodiment is included in at least one embodiment. Thus, appearances of the phrase "in one embodiment," "in an embodiment," and similar language throughout this specification may, but do not necessarily, all refer to the same embodiment.

It is contemplated that, in preferred embodiments, the methods described below will be carried out in a computing environment including at least two computing devices in electronic communication with one another. The first device will be referred to as a "server" or a "central" device, and the second device will be referred to as a "client" or a "terminal" device. References to "users" refer generally to individuals accessing a particular computing device or resource, to an external computing device accessing a particular computing device or resource, or to various processes executing in any combination of hardware, software, or firmware that access a particular computing device or resource. Both the client and server devices are, preferably, general purpose computing devices, which may include non-volatile storage, a programmable processor, input/output devices, and network interface devices. The non-volatile storage may encode computer readable instructions that, when executed, cause the processors in the server and client devices to execute the method steps described throughout this disclosure.

The client devices discussed below preferably also include circuitry and electronic instruments necessary to measure a physical characteristic of some physical object, such as a PUF, or preferably, a biological object and to generate responses from the resulting measurements. An optical image capture device such as a camera (having an optical imaging system, a 2-D detector and, optionally, illumination optics such as LEDs) is one example of such an electronic instrument. Other examples would include 2-D or 1-D flatbed scanners for taking image data of a fingerprint. In certain cases, the client device may be a smart phone including a camera. In certain cases, the central and terminal devices may be processes running on the same device.

In the examples that follow, a biological object is used as the foundational element for CRP generation, however the inventive embodiments are not so limited. It should be understood that the methods described herein apply to any CRP generation mechanism based on any unclonable physical object. In addition to biological objects, PUFs, including addressable PUFs, may also be used as the CRP mechanism. In these embodiments, the challenge represents measurement conditions (such as device addresses) for the PUF, and the response is based on a measured physical characteristic of the device under the specified conditions. Exemplary usable PUF arrangements are disclosed in U.S. patent application Ser. No. 17/879,697, entitled "PUF-PROTECTED PSEUDO-HOMOMORPHIC METHODS TO GENERATE SESSION KEYS," published as 20230045288 on Feb. 9, 2023, which is incorporated herein by reference in its entirety. Exemplary PUF devices usable with embodiments described below include PUF devices of the following types: SRAM cells; ring oscillator circuits; gate delay circuits: resistive memory devices; ferroelectric memory devices; phase change memory devices; magnetic memory devices; flash memory devices; and one-time programmable memory devices. Non-limiting examples of measurable physical characteristics of devices used in PUF arrays are time delays of transistor-based ring oscillators and transistor threshold voltages. Additional examples include data stored in SRAM or information derived from such data. For example, an SRAM PUF exploits the metastability in the start-up process of SRAM cells. In the instant after start-up, the two halves of each SRAM cell circuit both try to pull the output of the memory cell to either a "1" or "0" state. Depending on the specific process variation of the transistors in the circuit, one half of the SRAM cell will be unpredictably stronger and will force the SRAM cell into the corresponding state. The behavior of the structure of SRAM cells must then be combined in some way by a control system or architecture to provide the challenge/response mechanism and provide the PUF interface. In the example of an SRAM-based PUF device, the device could be power-cycled 100 times and the frequency of the "0" or "1" state could be used as a characteristic of that device. Other non-limiting examples of suitable characteristics include optical measurements. For instance, a PUF device may be an optical PUF device which, when illuminated by a light source such as a laser, produces a unique image. This image may be digitized, and the pixels may be used as an addressable PUF array. A good PUF should be predictable, and subsequent responses to the same challenge should be similar to each other (and preferably identical).

Other physical objects may also be used as a CRP mechanism. For example, image data may be taken and measured of biological objects from non-human subjects, or from non-biological natural objects, the appearance of which, demonstrates sufficient randomness and complexity. For example, U.S. patent application Ser. No. 15/434,976, published as 20170235938 on Dec. 10, 2019 describes taking image data of DNA or nanoparticles and then measuring those images as a CRP mechanism. That application is incorporated by reference herein in its entirety In the examples that follow, a biological object, unique to an individual, is used as an unclonable function, capable of generating unique and repeatable responses when measured according to certain measurement parameters (challenges). In practice, the biological object is some feature of an individual user's body (e.g., a fingerprint, iris, retina, facial features, etc.). The challenges are instructions that specify a particular set of biological object measurement conditions. For example, a challenge might be a location on an image of a fingerprint, and an area at that location to be measured. The responses might be features (variations in color or shade or shape, intersection of lines, etc.) measured at the specified area or areas, or along a specified directions. In some embodiments, a biological object may be subject to a pre-enrollment setup state to generate calibration data that is used to standardize all future image data taken from the object. This enables future measurements of the same object to performed under the same conditions as prior measurements. In the case of taking image data from the object, the pre-enrollment data may enable the system to rotate and scale future images to a baseline orientation and scale before each response measurement such that all measurements of the same features are as repeatable as possible. This same calibration and scaling methodology may be applied to any of the protocols described below, which all involve measuring a first set of enrollment responses from a biological object, and comparing those responses to a second set of responses from the same biological object measured at a different time in the future. These two measurements have to be compatible, so inventive embodiments are capable of rotating and scaling images, and calibration data may to stored to accomplish this.

In the examples that follow biometric prints are used as the CRP mechanism. As stated above, a biometric print is some accurate data representation of the biological object, e.g., processed or unprocessed image data of finger prints, palms, facial features, retinal vasculature and other vein patterns, iris appearance, combinations thereof, image data regarding body gait or infrared images of body parts. It is important to note, however, that other CRP mechanisms can be used in conjunction with the protocols that follow. For example, PUFs may be used as a CRP mechanism. Indeed, while the protocols described herein are advantageous because they address problems inherent to measuring responses from physical objects during different points in time, the CRP mechanisms described need not be physical. The methods work even with deterministic and/or nonphysical CRP mechanisms, including hash functions, onetime pads, etc.

In the examples that follow, methods for enhancing image recognition techniques with challenge-response-pair (CRP) mechanisms for secure key exchange and authentication are disclosed. The methods are advantageous because they do not require storing any personal biometric information after enrollment cycles. Below are presented examples of encryption key exchange protocols for several applications such as securing access control, financial transactions, video conferencing, online payments, border crossing, transfer of digital files, and ATM-based transactions. The protocols minimize both the false reject rates (FRRs) that are caused by poorly reliable mechanisms, and the false acceptance rates (FARs) that are caused by opponents having similar biometric information. Unlike existing protocols that cannot generate error free high entropy cryptographic keys from biometry, the CRP mechanisms described in this paper can handle bit error rates (BERs) affecting the biometric information that are as high as 40% and generate error free cryptographic keys without additional error correcting codes (ECCs).

Before the specific embodiments depicted in the figures, an overview of a basic method of key generation is provided. The specific embodiments below add onto this basic method. The basic method will be described in the context of a measured biological CRP mechanism being a human face, and the biometric print being an image of that face.

An enrollment procedure is conducted in a secure environment. The enrollment procedure begins with the generation of an ordered sequence of n random seed numbers. In the exemplary methods described below, input parameters, "challenges", which are measurement conditions for the biological object, in this case a face, are generated from random seeds. These seeds are shared by the client and the server and used by both to generate n challenges: C1, C2, . . . , Cn. These challenges are functions that operate on information generated from biometric images, in a manner similar to that of a one-way function to produce outputs. In the exemplary cases described below, a user individual presents an image of her face by looking into a camera. This image is transformed into a vector v (i.e., a biometric print) upon which the challenge functions Ci operate, producing an ordered sequence of n responses: R1, R2, . . . , Rn, with each $Ri=Ci$ (v). The challenge functions have the following properties. In a manner similar to a one-way function, it should a very hard problem to map back from the responses Ri and obtain any information about the biometric information v. Also, different responses Ri, Rj with i not equal to j, arising from different randomly generated Ci, Cj, should be completely independent of each other. However, if the identical challenges Ci are applied to a slightly different vector v' arising from a very similar image of the same person, the responses $R'i=Ci(v')$ should be very close to each other. This behavior is quite different from a standard hash function, where even one bit of difference in the input should create an entirely different output. To summarize, a vector of n functions of slightly different images of the same face: (R'1, R'2, . . . , R'n) should be very close to the original vector (R1, R2, . . . , Rn) when the same collection of challenges C1, C2, . . . , Cn is applied to the two vectors v and v' generated by the same client. One way of thinking about this is that a collection of different images of the same client should map to n-dimensional vectors inside a sphere of small radius in n-dimensional space. However, a different client should produce a vector w of biometric information whose corresponding vector of responses under the same challenges: (C1(w), C2(w), . . . , Cn(w)) is as distant as possible from the sphere containing (C1(v), C2(v), . . . , Cn(v)). The methods described below achieve this balance, that is, mapping similar images of one client to a small sphere, and mapping images of a different person to a discernably different position in space, is achieved, which greatly enhances the usability and security of the described protocols.

At the end of the enrollment the server and client each store the ordered list of challenge-generating seeds. In the first protocol presented below, the server can store the ordered list of responses. Neither stores any private biometric information During an authentication session a client looks into a camera second time, and creates a second image of her face, and maps this to a vector v', duplicating the process used during enrollment. The client then regenerates the challenges C_i from the stored seeds. The client then generates, from a random seed, a cryptographic key of length n, for example a sequence of n 1's and 0's. Suppose there is a 1 in location m. The client then applies C_m to v', obtaining $R'm=Cm·(v')$. The client repeats this with each 1 in the key: computing a response for each. This list, averaging n/2 responses, is then conveyed, possibly insecurely, to the server. The server compares this subset of responses to its ordered list of the full set of n responses. The server takes the first response on the list and compares it with its original list of responses. If there is a sufficiently close match with a response on the original ordered list, the server places a 1 in the corresponding key. It then continues, matching the subset of responses to the closest fitting ones in its list. At the end, the key was shared.

A comparison of two non-matching responses will probably differ by at least 25% of their bits. If the protocol is designed properly, the correct client should have responses that match up with their corresponding entries from enrollment by no worse than 10% bit errors. Thus, at the end of this process the client will have been authenticated (a different person will probably produce no responses with a better than 25% matching rate), and will also have successfully shared the ephemeral key, which can then be used for a continued secure session. At no point has private biometric information been revealed.

Figure 2:
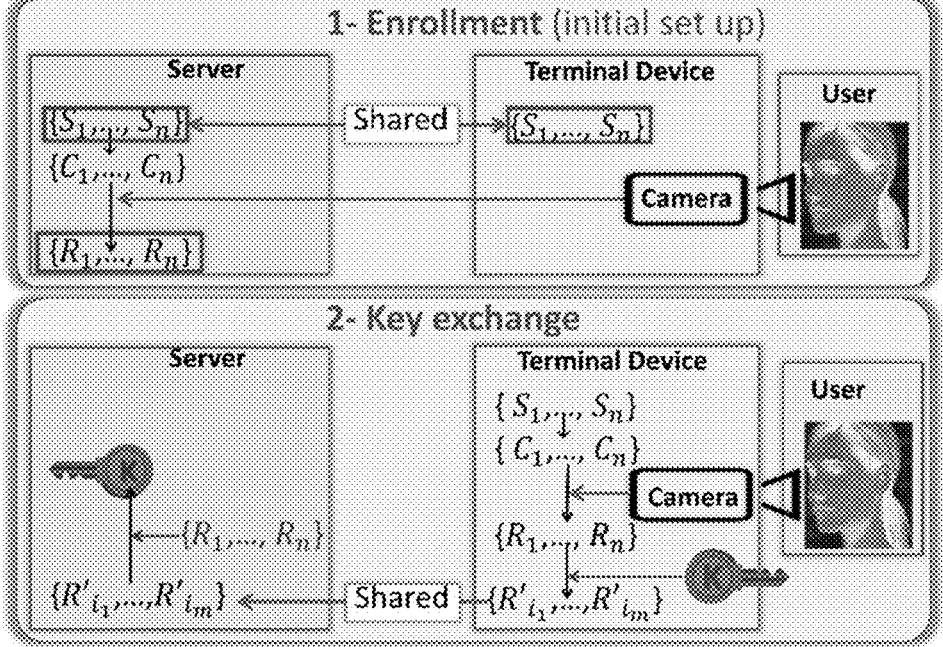
FIG. 2 schematically depicts an arrangement for enrollment and subsequent key exchange between a server and client device.

Referring now to FIG. 2, there is shown a method of cryptographic key exchange between a server device ("server") and a terminal device ("user") according to one inventive embodiment. The protocol described in reference to FIG. 2 and throughout the remaining examples of this disclosure uses biometry (i.e., the measurement of some biological object) to share cryptographic keys without keeping any image data captured during enrollment. Exemplary biological objects, biological prints derived therefrom, suitable challenge instructions, and the sorts of responses measured for those challenges are set forth in U.S. patent application Ser. No. 18/397,975, which again is incorporated by reference herein in its entirety, and to which this case claims priority.

In the arrangement of FIG. 2, there is an initial enrollment process shown in "1", "initial set up". Preferably, this process occurs in a trusted environment as part of a secure video conferencing event. During the enrollment cycle, a biometric print of an individual using the terminal device is sent to the server for processing (i.e., the generation of responses). The response generation step will be repeated by the user later, using a different (i.e., contemporaneous) biometric print. During the enrollment cycle, the server needs to process the biometric image of the user with CRP mechanism; the user follows the same CRP-based process during the key exchange operation.

The enrollment cycle proceeds as follows:

1. During the secure setup session, the terminal device creates a sequence of 256 bit seeds and sends them to the server. The seeds may be generated with the assistance of a random number generator (RNG), running on a processor at the terminal device. The seeds may also be generated with a password, supplied by the user, which may be processed (e.g., sequentially hashed with an extended output function). Some combination of the aforementioned methods may also be used (e.g., by hashing a password with the output of a RNG, concatenating the two, etc.). The result is preferably an ordered sequence of 256 bit seeds of length n, as shown below:

$$\{S_1, S_2, \ldots, S_n\} \text{ with } S_i \in \{0,1\} \text{ and } i \in \{1, n\}$$

2. The server uses the seeds as, or preferably to create an ordered sequence of n challenges, for example by using a hash function with an extended output function (XoF):

$$\{C_1, C_2, \ldots, C_n\} \leftarrow \{S_1, S_2, \ldots, S_n\}$$

3. The terminal device captures a biometric print (e.g., image data of a biological object of the individual user such as an image of the user's face, retina etc.), and sends it to the server. Alternatively, the server is in real time video conferencing with the terminal device and user and is allowed to capture a biometric image using the terminal device's camera.

4. The server applies the CRP mechanism of the image to the n challenges to generate n responses. That is to say, the server uses the challenges as measurement instructions and measures the biometric print in accordance with those instructions:

$$\{R_1, R_2, \ldots, R_n\} \leftarrow \{C_1, C_2, \ldots, C_n\}$$

It is preferrable for the responses to be appreciably long to achieve BERs of below 20%, for example, 256-bits long. In certain embodiments, this may be accomplished by providing the raw response data to a hashing for XoF function, which is then stored as the responses.

5. The server finally erases the seeds $\{S_1, S_2, \ldots, S_n\}$, the sequence of n challenges $\{C_1, C_2, \ldots, C_n\}$, retaining in memory only the sequence of n responses $\{R_1, R_2, \ldots, R_n\}$.

6. The user retains only in its memory the sequence of seeds $\{S_1, S_2, \ldots, S_n\}$.

At the end of the enrollment the server and client each store the ordered list of challenge-generating seeds, and the server can store the ordered list of responses. Neither stores any private biometric information.

The key exchange cycle proceeds as follows:

1. The seeds are used again to create an ordered sequence of n challenges:

$$\{C_1, C_2, \ldots, C_n\} \leftarrow \{S_1, S_2, \ldots, S_n\}$$

2. The terminal device captures a biometric self-image of the user with the same camera, and similar macro-measurement conditions as the capture used during enrollment. The system may optionally calibrate the second image data such that it matches the image data taken during enrollment. This process may involve scaling and rotating the image and adjusting signal level such that it matches the initial image taken during enrollment.

3. The terminal device applies the CRP mechanism to the n challenges to get n responses:

$$\{R'_1, R'_2, \ldots, R'_n\} \leftarrow \{C_1, C_2, \ldots, C_n\}$$

4. The terminal device randomly generates (e.g., with an RNG) an n-bit long key K. The bits are then ordered from position 1 to position n. An m-bit long subset of index integers $\{i_1, i_2, \ldots, i_m\}$ is generated by capturing the positions of K's entries equal to "1", ignoring the entries equal to "0"; $i_j \in \{1, n\}$, and $j \in \{1, m\}$.

The space of choices here has size roughly $2^n$, n should be large enough, 256, or higher 5. The client sends only the list of m responses $\{R'_{i_1}, R'_{i_2}, \ldots, R'_{i_m}\}$ to the server, 6. The server identifies the sequence $\{i_1, i_2, \ldots, i_m\}$ as follows:

a. Let $d(R'_{i_j}, R_k)$ denote the hamming distance between the responses $R'_{i_j}$ and $R_k$.

b. For each $R'_{i_j}$, the server cycles through the list of responses from position 1 to position n, and finds the unique k such that:

$$d(R'_{i_j}, R_k) < \varepsilon, \text{ where } \varepsilon \text{ is the cutoff point.}$$

[With n=256 and BER<20%, an $\varepsilon$ of 52 bits should keep FARs and FRRs low]

7. From the list of indices $\{i_1, i_2, \ldots, i_{(m)}\}$ the server can uncover the key K.

The server and client can then use the shared Ks to encage in encpted communications. The shared keys may be used to encrypt and decrypt communications according to any symmetrical encryption protocol (e.g., AES). The keys may also be used by each party to authenticate the other, e.g., by signing some shared piece of information and comparing the result.

To restate the key sharing process, the client uses its stored seeds to generate a sequence of n challenges. The biometric print is measured in accordance with the challenges to generate an ordered sequence of n responses (i.e., a first response, a second response, etc., up to the nth response). A random binary number K is generated of length n. That number will have a sequence of m 1s. Responses in the ordered sequence corresponding to positions in the random number having the value "1" are identified, and only these m responses are sent to the server. In other words, if n=3, there are three responses R'1, R'2 and R'3. If the random number K is 101, m=2 and only responses R' 1 and R'3 are sent to the server, corresponding to the first and third 1s in K. The server knows the length of K, because it is equal to the originally received number of responses, n. The server selects R'1, and it sequentially computes the Hamming distance between R'1 and every response that it stored during enrollment R1 . . . Rn. Where this computation results in a Hamming distance below some threshold, or the minimum Hamming distance of all the computations in the sequence, the server has determined the position of R'1 in the order of the original responses. In the example above, the Hamming distance between R'1 and R1 will be low, and in fact, it should be the lowest Hamming distance of any of the comparison steps. The server knows that R1 was the first response in the enrollment sequence, so it knows that R'1 is also the first response in the sequence of exchange responses, so it assigns the first position in the key a "1". R'3 will match with R3, and so the third position in the key will be assigned a "1". All other positions are assigned "0". In this manner, the server has generated K.

In another embodiment of the key exchange protocol, steps 4 to 7 in the algorithm above are modified by sending n responses in the key exchange step, but where random responses have been inserted for enrollment responses within m corresponding to positions in n where the entries for K are zero. Optionally, but preferably, the enrollment response string is reordered randomly. The server then takes each of the new responses, and sequentially attempts to match it against the enrollment responses. If there is a match, an entry of 1 is assigned to the server's copy of K in the position of the match response. For all unmatching responses, the server's copy of K is assigned a zero in the corresponding position. This embodiment introduces more entropy to the system at a cost of requiring the server to check matches for all n of the received responses during the key exchange step. As above, a match between a second response and a first response may be determined by computing a Hamming distance and declaring a match when the Hamming distance is below some threshold, or for whatever first response the second response demonstrates the minimal Hamming distance across the set.

This modified protocol proceeds as follows:

1. The user chooses randomly a n-bit long key K. The bits are then ordered from position 1 to position n. The sequence of n responses is altered by replacing the responses positioned at entries equal to "0" by randomly generated streams of the same length. The responses positioned at entries equal to "1" are kept intact. This results in a new set of n responses that are reordered randomly: $\{R'_{p_1}, R'_{p_2}, \ldots, R'_{p_n}\}$.

2. The client sends only the list of n responses $\{R'_{p_1}, R'_{p_2}, \ldots, R'_{p_n}\}$ to the server.

3. The server differentiates the valid responses as follows:
   a. Let $d(R'_{p_j}, R_k)$ denotes the hamming distance between the responses $R'_{p_j}$ and $R_k$.
   b. For each $R'_{p_j}$ with intact response, corresponding to a "1" entry of K, the server cycles through the list of responses from position 1 to position n, and finds the unique k such that: $d(R'_{k_j}, R_k) < \varepsilon$, where $\varepsilon$ is the cutoff point.
   c. For each $R'_{p_j}$ with a response changed to a random stream, corresponding to a "0" entry of K, no $R_k$ matches are available due to the high entropy of the CRP mechanism.

4. From the list of matching positions, the server can uncover the key K.

This last protocol is simplified in other alternative embodiments by eliminating the random reordering of the revised n responses at the end of step 4. The search of step 6 is then much faster as the server does not have any more to cycle through the list of responses. The number of searches is reduced to n searches rather than a number that could be as high as $(n^2)/4$.

The key exchange protocols described above can be further enhanced to eliminate collisions and remove the pairs that are not reliable. One possible protocol starts with a greater number of challenges, for example 2n, and selects only half of the challenges. The server iterates multiple CRP cycles with the set of 2n challenges to test BERs. The server only keeps the n collision-free challenges with the lowest BERs. A 2n-bit long mask is generated with the entries at 0 for the positions that should be eliminated, and entries at 1 for the positions that are kept. An outline of the modified enrollment is the following:

1. n-bit long seed: $\{S_1, S_2, \ldots, S_n\}$ with $S_i \in \{0, 1\}$ and $i \in \{1, n\}$
2. The server generates 2n long challenge: $\{C_1, C_2, \ldots, C_{2n}\} \leftarrow \{S_1, S_2, \ldots, S_n\}$.
3. Capture a biometric image.
4. The server finds a 2n-bit long mask M to generate the responses:

$$[\{R_1, R_2, \ldots, R_n\}; \text{Mask } M] \leftarrow \{C_1, C_2, \ldots, C_{2}n\}$$

5. The server retains in memory the sequence of n responses $\{R_1, R_2, \ldots, R_n\}$, and sends M to the user.
6. The user retains only in its memory mask M, and the sequence of seeds $\{S_1, S_2, \ldots, S_n\}$.

The outline of the modified key exchange cycle is described as follows:

1. The user generates the 2n long set of challenges: $\{C_1, C_2, \ldots, C_{2}n\} \leftarrow \{S_1, S_2, \ldots, S_n\}$.
2. Biometric image.
3. The user applies the CRP mechanism to the 2n challenges with the mask M to get n responses:

$$\{R'_1, R'_2, \ldots, R'_n\} \leftarrow [\{C_1, C_2, \ldots, C_2 n\}, M]$$

4. The user chooses key K. The subset of integers $\{i_1, i_2, \ldots, i_m\}$ is generated by capturing the 1's.
5. The client sends the m responses $\{R'_{i_1}, R'_{i_2}, \ldots, R'_{i_m}\}$ to the server.
6. The server identifies K from the sequence $\{i_1, i_2, \ldots, i_m\}$.

This collision avoidance and masking protocol can also adopt the variation presented above, in which the size of the sequences of responses is kept constant by replacing the responses positioned at entries of 0 of K by random streams.

Figure 3:
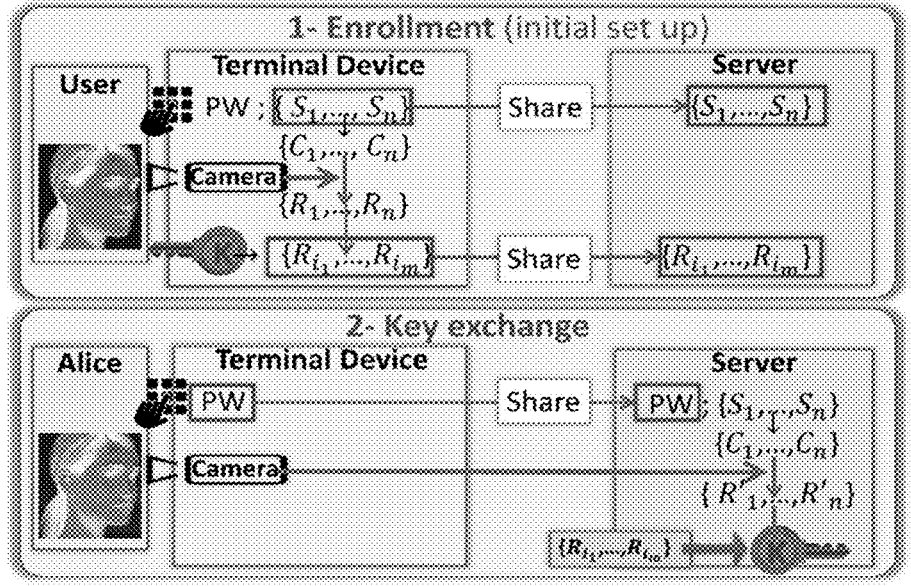
FIG. 3 schematically depicts an arrangement for enrollment and subsequent key exchange between a server and client device using multi-factor authentication.

Referring now to FIG. 3, there is shown an alternative embodiment of a system for key exchange using biometric information that also incorporates multi-factor authentication (MFA). As in the embodiment of FIG. 2, an embodying system may include a secure video conferencing event in which the user activates the camera of the terminal device to create a biometric print. The user enters a password and processes the biometric image during the enrollment cycle. The server needs both the password and access to the image of the user to be able to retrieve the shared key.

An enrollment cycle proceeds as follows:

1. During the secure setup session, server and user create and share, from a random number generator (RNG) an ordered sequence of n 256 bit seeds:
   a. $\{S_1, S_2, \ldots, S_n\}$ with $S_i \in \{0,1\}$ and $i \in \{1, n\}$ 2. The user concatenates the seeds with a password PW to create an ordered sequence of n challenges, by hashing the concatenated stream with an extended output function (XoF):
   $\{C_1, C_2, \ldots, C_n\} \leftarrow [\{S_1, S_2, \ldots, S_n\} \oplus PW]$ 3. The user captures a biometric image from the camera.
4. The user applies the CRP mechanism to the n challenges to generate n responses:
   $\{R_1, R_2, \ldots, R_n\} \leftarrow \{C_1, C_2, \ldots, C_n\}$.

5. The user chooses randomly a n-bit long key K. The bits are ordered from position 1 to position n. The m-bit long subset of integers $\{i_1, i_2, \ldots, i_m\}$ is generated by capturing the positions of the entries equal to 1, ignoring the entries equal to 0; $i_j \in \{1, n\}$, and $j \in \{1, m\}$.
6. The client sends only the list of m responses $\{R_{i_1}, R_{i_2}, \ldots, R_{i_m}\}$ to the server,
7. The user erases all information, only storing the password PW, and the key K.
8. The server retains the sequence of seeds $\{S_1, S_2, \ldots, S_n\}$, and the set of m responses $\{R_{i_1}, R_{i_2}, \ldots, R_{i_m}\}$.

The key exchange protocol proceeds as follows:

1. The server uses the password and the seeds, by the same hashing processed described above, to create the same ordered sequence of n challenges originally used by the terminal device during enrollment:
   $\{C_1, C_2, \ldots, C_n\} \leftarrow \{S_1, S_2, \ldots, S_n\}$ 2. The server receives a biometric image of the user taken with the same camera.
3. The server applies the CRP mechanism to the n challenges to get n responses:
   $\{R'_1, R'_2, \ldots, R'_n\} \leftarrow \{C_1, C_2, \ldots, C_n\}$ 4. The server identifies the sequence $\{i_1, i_2, \ldots, i_m\}$ as follows:
   a. Let $d(R'_{i_j}, R_k)$ denote the hamming distance between $R_k$ and $R'_{i_j}$.
   b. For each $R'_{i_j}$, the server cycles through a list of responses to find the unique k such that: $d(R'_{i_j}, R_k) < \varepsilon$, where $\varepsilon$ is the cutoff point.
5. From the list of indices $\{i_1, i_2, \ldots, i_m\}$ the server can uncover the key K.

The MFA presented in section 2 is also valuable to keep constant the size of the sequences of responses by replacing the responses positioned at entries of 0 of K by random streams.

The key exchange protocol should be enhanced to eliminate collisions, and to remove the pairs that are not reliable. As done in section 2, a similar protocol starts with a greater number of challenges, for example 2n, and selects only half of them. The user, rather than the server, iterates multiple CRP cycles with the set of 2n challenges to test BERs. The user only keeps the n collision-free challenges with the lowest BERs. A 2n-bit long mask is generated, and communicated to the server, with the entries at 0 for the positions that should be eliminated, and entries at 1 for the positions that are kept.

It will be noted that in the protocol discussed above using MFA, the client generates n seeds, n initial responses, and an m long key at enrollment, and then uses the key to select a subset of m initial responses. These are sent to the server, which are then stored. Later, the server n second responses using the biometric print, and then compares each of the initially received responses to the subsequently generated responses. This is in contrast to the method set forth in FIG. 2, where the client sends a full set of initial responses initially, during enrollment, and then matching is later performed on a subset. However, it should be noted that either of these methods is applicable in either case. In the arrangement of FIG. 2, a key could be generated initially by the client during enrollment, and a subset of the responses could be sent to the server. Additionally, in the arrangement of FIG. 3, the full set of responses could be sent to the server during enrollment, and a key generated and a subset of second responses selected later. Additionally, the use of a user password, in addition to an RNG, to generate the challenges may be incorporated into the embodiment of FIG. 2.

Figure 4:
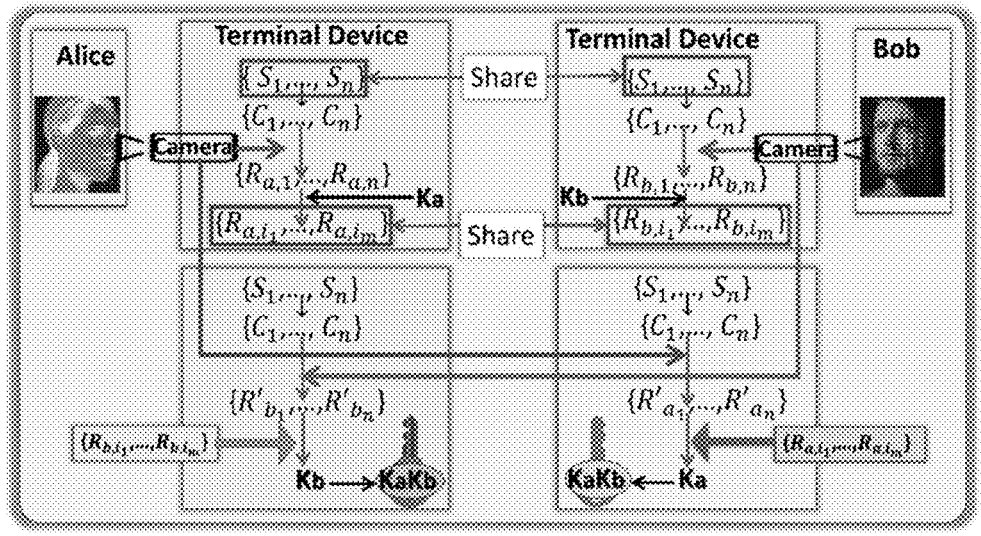
FIG. 4 schematically depicts a method for key generation and exchange in a peer-to-peer arrangement between terminal devices.

Referring now to FIG. 4, there is shown a method for peer to peer key exchange incorporating CRP mechanisms based on biometric images of two users. As in the embodiments described above in reference to FIGS. 2 and 3, a set up includes a secure video conferencing event in which both users activate the camera of their terminal devices. The protocol described here is a simpler version which, in certain embodiments, is enhanced with collision avoidance, masking and the password/MFA methods described above in reference to FIGS. 2 and 3.

Key exchange according to the peer to peer arrangement of FIG. 4 begins with an enrollment cycle in which two users of two clients (e.g., two terminal devices, herein referred to as Alice and Bob) engage in enrollment. The enrollment cycle is preferably initiated with when one client makes a key exchange request of another, which receives the request.

After completion of the key exchange, a shared key remains available to both users after completion of the video conference, and no biometric images are left behind. During the initial enrollment cycle, each user generates a sequence of responses encapsulating both their own secret key, and the biometric image. The users are sharing these sequences during the video conference. During the key generation cycle, each user needs to have access to the biometric image of the other communicating party to be able to generate the shared key from the sequence of shared responses.

The enrollment cycle proceeds as follows:

1. During the video conference, both users create and share from a RNG an ordered sequence of 256 bit seeds of length n. That is, the users share the set of random seeds. One user can create the seeds with its own RNG and send to the other user (e.g., as part of a request to initiate key exchange). Alternatively, each party can create some subset of the seeds and send its fraction to the other party, where each party combines the self- and other-generated seeds to arrive at the same combined list of seeds. In any case, both parties end up with the same list of n seeds:

$$\{S_1, S_2, \ldots, S_n\} \text{ with } S_i \in \{0,1\} \text{ and } i \in \{1, n\}$$

2. Both users independently create an ordered sequence of n challenges, for example by hashing the seeds with an extended output function (XoF):

$$\{C_1, C_2, \ldots, C_n\} \leftarrow \{S_1, S_2, \ldots, S_n\}$$

3. Both users independently capture a biometric image from their own camera.

4. Both users independently apply the CRP mechanisms of their image to the n challenges to generate n responses. Alice and Bob generate their own sequences:

$$\text{Alice}: \{R_{a1}, R_{a2}, \ldots, R_{an}\} \leftarrow \{C_1, C_2, \ldots, C_n\}$$

$$\text{Bob}: \{R_{b1}, R_{b2}, \ldots, R_{bn}\} \leftarrow \{C_1, C_2, \ldots, C_n\}$$

5. The users each randomly choose an n-bit long subkey, respectively $K_a$ for Alice and $K_b$ for Bob. The bits are then ordered from position 1 to position n. The respective m-bit subset of integers $\{i_1, i_2, \ldots, i_m\}$ for Alice, and $\{j_1, j_2, \ldots, j_m\}$ for Bob, are generated by capturing the positions of the entries equal to 1, ignoring the entries equal to 0; $i_j \in \{1, n\}$, and $j \in \{1, m\}$.

6. The users send to the other party their respective list of m responses, $\{R_{a,i_1}, R_{a,i_2}, \ldots, R_{a,i_m}\}$ from Alice to Bob, and $\{R_{b,j_1}, R_{b,j_2}, \ldots, R_{b,j_m}\}$ from Bob to Alice.

7. Both users retain in memory the seeds $\{S_1, S_2, \ldots, S_n\}$, the sequences of m responses received from the communicating party ($\{R_{a,i_1}, R_{a,i_2}, \ldots, R_{a,i_m}\}$ or $\{R_{b,i_1}, R_{b,i_2}, \ldots, R_{b,i_m}\}$), and their subkey ($K_a$ or $K_b$).

Later, both users engage in key exchange. The key exchange protocol proceeds as follows:

1. Both users generate the same sequence of n challenges from the same seeds:

$$\{C_1, C_2, \ldots, C_n\} \leftarrow \{S_1, S_2, \ldots, S_n\}$$

2. Both users receive a biometric print of the party, or use the other party's camera to capture the other party's biometric image.

3. Both users apply the CRP mechanism to the n challenges to get n responses:
   Alice is getting: $\{R'_{b1}, R'_{b2}, \ldots, R'_{bn}\} \leftarrow \{C_1, C_2, \ldots, C_n\}$.
   Bob is getting: $\{R'_{a,1}, R'_{a2}, \ldots, R'_{an}\} \leftarrow \{C_1, C_2, \ldots, C_n\}$.

4. Both users find the subkey of their communicating party from the sequences of m responses received during the enrollment cycle, and the sequences of n responses generated through the CRP mechanism:
   Alice is computing $K_b$ from $\{R'_{b1}, R'_{b2}, \ldots, R'_{bn}\}$ and $\{R_{b,i_1}, R_{b,i_2}, \ldots, R_{bi_m}\}$.
   Bob is computing $K_a$ from $\{R'_{a1}, R'_{a2}, \ldots, R'_{an}\}$ and $\{R_{a,i_1}, R_{a,i_2}, \ldots, R_{a,i_m}\}$.
   Each user thereby finds the shared key $K_a K_b$.

As in all the examples above, the shared key may be used to engage in encrypted communications and/or to authenticate the other party.

In alternative embodiments, the protocol set forth in FIG. 4 is modified with the variations described above, including the variation described in reference to FIG. 2, in which the sizes of the sequences of responses are kept constant by replacing the responses positioned at entries of 0 of $K_a$ and $K_b$ by random streams.

The key exchange protocol may also optionally be enhanced to eliminate collisions, and to remove the pairs that are not reliable. Following the protocol presented in reference to FIG. 2, each user may generates a 2n-bit long mask to remove the least desirable challenges and reduces the sequences to n elements. The masks are shared with the other party to finalize the key exchange protocol.

Figure 5:
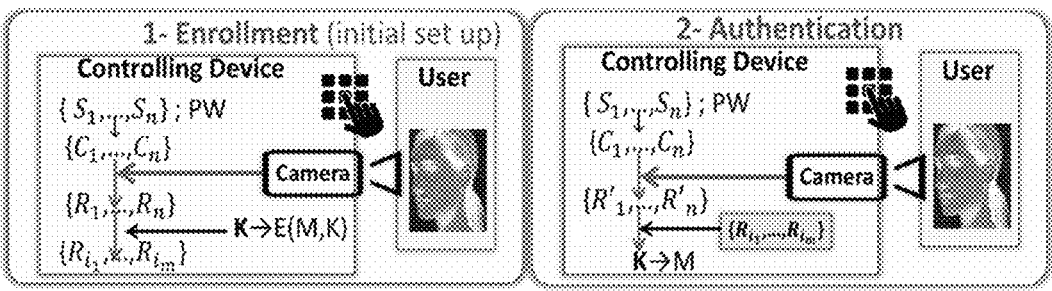
FIG. 5 schematically depicts an access control arrangement using multi-factor authentication.

The methods described thus far may be extended to provide access control for trusted users of devices or to secured physical areas. The goal of these systems to enable an enrolled individual to access some physical or electronic resource with memorized information and their biological object (e.g., their face), which has been previously enrolled. Such an arrangement is depicted in FIG. 5, in which access control is implemented using both biometric data and a password to provide MFA.

The objective of the access control protocol presented in this section is to use biometry without keeping the image captured during the enrollment cycle. An example of a set up supporting such protocol is a camera connected to a terminal device or a controlling server. Another use case is to use the method to secure a smart phone. The smart phone initiates an enrollment cycle before powering off the device. A key K is generated from the CRP mechanism to encrypt an authentication file M. The key K, and the file M are recovered during the authentication process. A second use case is for access control to enter a secure facility. Another use case is ATM access. Like the arrangements above, the arrangement of FIG. 5 includes both an enrollment cycle and an authentication or access cycle.

An initial enrollment/set up cycle proceeds as follows:
1. The controlling device creates the ordered sequence of 256 bit seeds of length n:

$$\{S_1, S_2, \ldots, S_n\} \text{ with } S_i \in \{0,1\} \text{ and } i \in \{1, n\}$$

2. The device concatenates the seeds with password PW, preferably selected and entered by a user, to create an ordered sequence of n challenges, by hashing the concatenated stream with an extended output function (XoF):

$$\{C_1, C_2, \ldots, C_n\} \leftarrow [\{S_1, S_2, \ldots, S_n\} \oplus PW]$$

3. The device captures a biometric image from the user.
4. The device applies the CRP mechanism to the n challenges to generate n responses:

$$\{R_1, R_2, \ldots, R_n\} \leftarrow \{C_1, C_2, \ldots, C_n\}$$

5. The device chooses randomly a n-bit long key K. The bits are ordered from position 1 to position n. The m-bit long subset of integers $\{i_1, i_2, \ldots, i_m\}$ is generated by capturing the positions of the entries equal to 1, ignoring the entries equal to 0; $i_j \in \{1, n\}$, and $j \in \{1, m\}$.
6. The device retains the sequence of seeds $\{S_1, S_2, \ldots, S_n\}$, and the set of m responses $\{R_{i_1}, R_{i_2}, \ldots, R_{i_m}\}$.

The access control cycle proceeds as follows:
1. The seeds are used by the device to create an ordered sequence of n challenges:

$$\{C_1, C_2, \ldots, C_n\} \leftarrow \{S_1, S_2, \ldots, S_n\}$$

2. The device captures a biometric image of the user with the same camera.
3. The device applies the CRP mechanism to the n challenges to get n responses:

$$\{R'_1, R'_2, \ldots, R'_n\} \leftarrow \{C_1, C_2, \ldots, C_n\}$$

4. The device identifies the sequence $\{i_1, i_2, \ldots, i_m\}$ as follows:

a. Let $d(R'_{i_j}, R_k)$ denote the hamming distance between $R_k$ and $R'_{i_j}$.
b. For each $R'_{i_j}$, the server cycles through the list of responses and finds the unique k such that: $d(R'_{i_j}, R_k) < \varepsilon$, where $\varepsilon$ is the cutoff point.
5. From the list of indices $\{i_1, i_2, \ldots, i_m\}$ the controlling device can uncover the key K, and access is granted if the keys match.

The variation presented in reference to FIG. 2 may also be used to keep constant the size of the sequences of responses by replacing the responses positioned at entries of 0 of K by random streams.

In this protocol, the method to eliminate collisions presented in relation to FIG. 2 can also be used. The 2n-bit long mask can be kept confidential in the controlling device.

As stated above, one important advantage of the methods described herein is that they are insensitive to noise being introduced into the measurement process of the biological object and they are insensitive to drift, aging or damage that may change the biological object over time, e.g., between enrollment and authentication. The techniques are also resistant to collision from biological objects presented by other, non-enrolled users. A specific example of the use of biometric prints in the manner that has been described will now be provided to demonstrate how robust the disclosed approach is.

Suppose the biological object used for key generation according to the methods disclosed herein is a human face. Using standard techniques, it is easy to identify landmarks related to nose, eyes, mouth etc. Typically, on the order of 68 locations are chosen. An x,y grid is established using eyes and nose to establish the axes and the coordinates of the landmarks are stored. Future captures of the same face will be rotated and scaled to map onto this same coordinate grid. One then maps this collection of coordinates to a high dimensional space (say on the order of 20000), where each coordinate is chosen to be some function of a relationship between the landmarks. An extremely simple option is to choose random (x,y) coordinates and compute distances of them to randomly selected landmarks. One can chose triples of landmarks and compute angles of the triangle formed by them. Or non-linear functions of distances between landmarks. The objective is to map to a high dimensional vector that encodes unique attributes of a face that will remain relatively stable after slight changes of expression or distances from the camera. Ideally, slightly different images captured at different authentication sessions will be mapped to points inside a sphere of small radius about the 20000 dimensional vector that is created during the enrollment session. The approach is successful if images of distinct faces consistently map to vectors that are a reasonably large distance from each other.

These vectors can be viewed as a secret key. They are generated by a face during an enrollment or authentication session and used to respond to a challenge, but they are erased after the session.

But what are the challenges and responses?

Given $\varepsilon > 0$ and $n \in N$, let $k > 0$ satisfy $k << \varepsilon^{-2} \log n$. Then for every set P of n points in $R^d$, with $d > k$, there exists $f: R_d \rightarrow R^k$ such that for all $u, v \in P$, $(1-\varepsilon)\|u-v\|^2 \leq \|f(u)-f(v)\|^2 \leq (1+\varepsilon)\|u-v\|$.

Translated into human-speak, these relations say that if the method picks any n points in a high dimensional space ($R^d$) there exists a function f that projects these n points into a much lower dimensional space $R^k$ and the relative distances between points will remain the same up to an arbitrary level of precision. Unfortunately, it was computationally hard to generate such functions. Essentially, the best solutions were projections by orthogonal matrices onto hyper planes. But it is very computationally expensive to generate orthogonal matrices.

A close to optimal solution is Database-friendly random projections. The idea is to generate a d by k matrix with entries 1 with probability ⅙, −1 with probability ⅙ and 0 with probability ⅔. Alternatively, another good solution has entries 1 with probability ½, −1 with probability ½. These solutions have been verified to work well in practice. In fact, and this is not predicted by the theorem, once such a matrix is generated it will with high probability preserve distances very precisely when projecting from dimension d down to k for any collection of n points it acts on.

A detailed example of CRP generation, enrollment and key exchange according to the scheme of FIG. 2 will now be provided.

In the enrollment phase, taking place in a secure environment, client and server agree on a set of seeds {S1, . . . , S256} and an initial facial image is recorded.

The client's image is mapped to a vector v0 of 68 landmark locations.

The vector v0 is mapped to v, with dimension of v=d, with d considerably larger than k, via a fixed continuous mapping. This is stored by the client and, depending on the use case, possibly by the server. A simple example of such a mapping is to choose random (x,y) coordinates and compute distances of them to randomly selected landmarks. For example, one can chose a triple of landmarks and compute angles of the triangle formed by them. Or non-linear functions of distances between landmarks such as:

$$(x0x1 + y0x2 + y1)/(y2x1 + x2 + x2)$$

Each of d such functions of v0 is mapped to one of the d coordinates of v.

The vectors v and v0 contain private biometric information and will be erased shortly.

A challenge is a random d by k matrix, called C, with k far smaller than d, generated from a seed, with entries occurring according to a probability distribution.

An exemplary distribution is: 1 with probability ⅙, −1 with probability ⅙, 0 with probability ⅔.

The server generates the 256 matrices, C_i, from this probability distribution after inputting the shared collection of seeds S_i.

The server interprets v as a row d-vector and compute the 256 k-vector responses Ri=vCi.

The server stores the ordered list of responses Ri and erases v and v0, the seeds and challenges.

Enrollment is now complete.

The key exchange procedure is as follows:

Assume that enrollment has already occurred, and K is a six bits, and the client wants to send the key 110001 to the Server. The client user scans her face again. (This image is similar, but not the same, as the image we sent to the server). Both parties know the seeds {S1, . . . ,S6}, and thus the client can regenerate the random matrices {C1, . . . , C6}. To send the key 110001, the client uses {C1, C2, C6} (for the first, second, and sixth bits). The client generates the vector vnew from the user's face and computes Ri=new Ci for I=1, 2, 6. Each of the $R_1$ will have dimension k and, perhaps, look something like this:

R1,new=(3.30,1.84,     .     .     .     ),R2,new=(3.08,
4.17, . . . ),R6,new=(−0.90,5.39, . . . )

The client now sends R1, new, R2, new, R3, new, to the server. The server compares these vectors to R1, R2, R3, R4, R5, R6, which were stored during enrollment. Next, the server determines which Ri the Rj, new correspond to. To do this the server computes Ri-Rj, newj for each pair (i,j). In this particular example:

R1,new-R1≈(35,458,452,444,450,456)

R2,new-R1≈(457,36,456,450,461,451)

R6,new-R1≈(456,452,444,446,451,34)

A Hamming distance threshold is supplied, and matches are declared when the response difference is below the threshold. The server successfully identifies bits 1, 2, 6, and agrees to the key 110001 while simultaneously authenticating the client.

Figure 6:
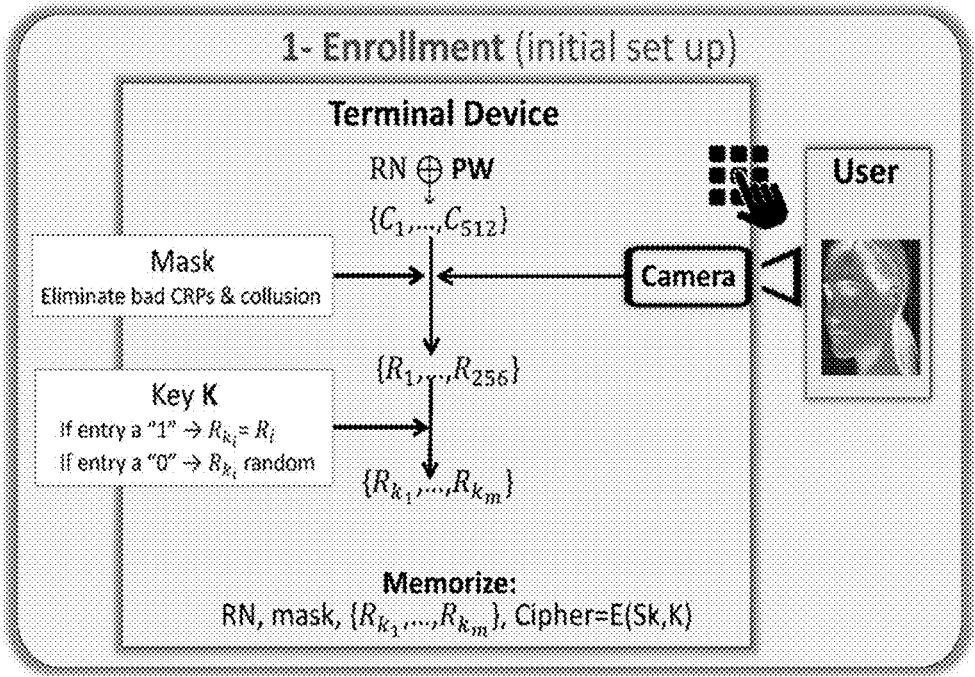
FIGS. 6 and 7 schematically depict encrypting and storing a digital file a terminal device and later retrieving the file using inventive methods.
Figure 7:
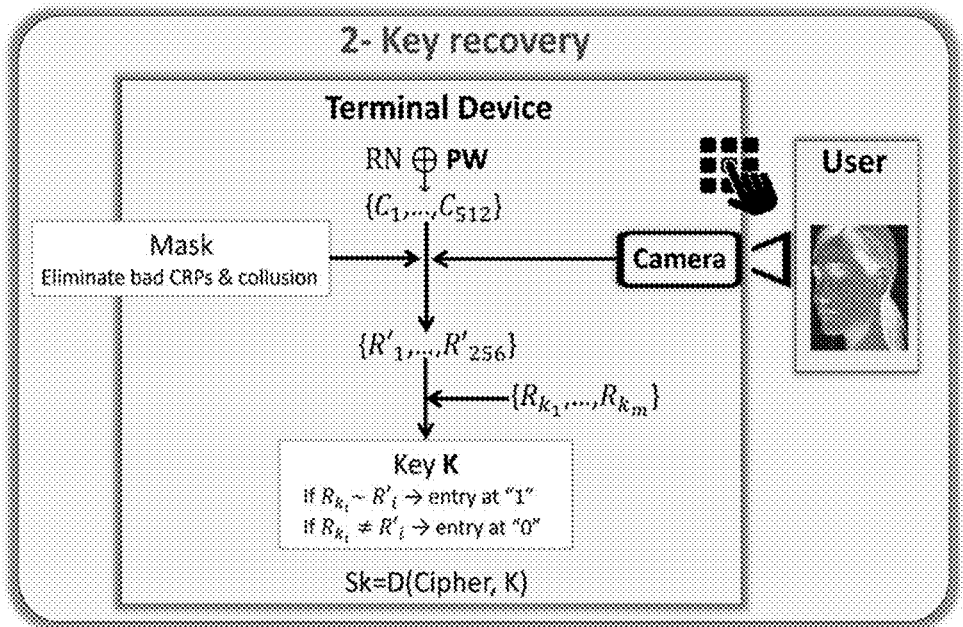

It will be understood that the instant methods and arrangements can be extended to other contexts, for example, the storage of encrypted digital files. FIGS. 6-7 show one such arrangement. In the arrangement of FIG. 6, a file encryption procedure is disclosed, which is similar to the enrollment procedures described above. A terminal device generates a random number string RN, and derives from that number a sequence of x challenges (e.g., 512). The challenge derivation procedure may include hashing each number in, e.g., a string of 512 random numbers with a password, as shown. A biometric print (e.g., a facial image) is taken, and each of the challenges is used to measure the biometric print. Preferably, measurements are repeated for each challenge to identify noisy/variable CRPs. Noisy/variable CRPs pairs are masked (or a predetermined mask is applied) to winnow down the challenges to some subset n (e.g., 256) of challenges known to produce good, repeatable and stable responses. An n bit long key K (e.g. 256) is randomly generated. The key K is used to encrypt some piece of information (i.e., some digital file) which may be a secret encryption key Sk. The resulting ciphertext may be stored at the device. To support future recovery of K, the device identifies the positions in K of a first binary symbol (e.g., the 1s). It then selects responses in the sequence of n responses corresponding to the positions of the first binary symbol in K. This results in a subset of m responses (typically around n/2 responses). These are stored, as are the random number string used to generate the challenges, and the mask (if being used). All other information is deleted.

The method for recovering K, which may then be used to decrypt the ciphertext and recover Sk, is shown in FIG. 7. The RN stream and the password are used to reproduce the challenges. A second biometric print is taken. The challenges are applied to the second biometric print to result in a superset of responses. Optionally, the mask is applied to reject noisy CRP pairs, resulting in a set of n responses. Each of the previously stored subset of m responses is compared to the responses in the set of n responses. For the positions of the responses in the set of n responses that match responses in the previously stored subset of m responses (e.g., where a Hamming distance is below some threshold), a "1" is placed in K. For all positions in K, a zero is placed. K has then been reproduced and can be used to decrypt Sk. While this method involves storing responses corresponding to 1s in K, the responses corresponding to 0 could be stored as an alternative.

Figure 8:
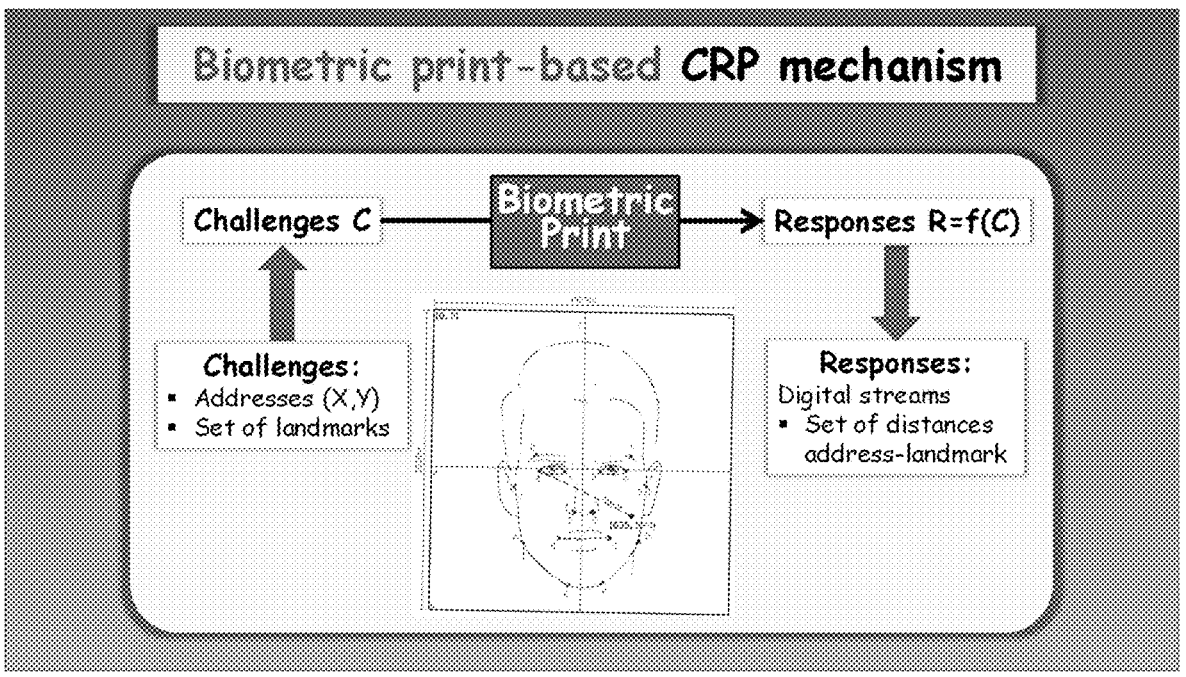
FIG. 8 shows how a biometric print of a human face may be used as a CRP generation mechanism according to the inventive embodiments.

FIG. 8 shows how a measureable biometric print can be used as a CRP generation mechanism according to the present embodiments. In the example of FIG. 8, the biological object is a human face, and the biometric print being measured is an image of the face. An image of a human face contains identifiable landmarks such as the bridge of the nose, the tip of the nose, pupils, etc. These landmarks are preferably identified in a pre-enrollment process, and calibration data is stored to rotate and orient future images of the same face to a standard x-y coordinate system, and to scale future images to a standard scale. An example of this process (shown in FIG. 8) would be to define a line connecting the center of pupils as the X axis of a reference coordinate system, and to scale the facial images such that the inter-pupillary distance for all images is a set amount in the coordinate system. This enables all images of the same face to be compared accurately.

As shown in FIG. 8, an exemplary set of challenges is a starting X-Y coordinate in the system, and a facial feature (e.g., –3, –4, center of left pupil). Random numbers (e.g., the seeds discussed above) may be parsed to render coordinates in a straightforward manner, and it is contemplated that a lookup table may be constructed that maps numbers to facial features. Thus, a random number like 11001010 may be decomposed into a first portion that maps to a first coordinate, a second portion that maps to a second coordinate, and third portion that maps to a facial feature through a predetermined lookup table. In this way, challenges may be constructed of random numbers, or random numbers expanded to certain lengths and/or hashed with passwords as discussed above. The responses are the results of applying these challenges. An exemplary response would be a scalar distance value (e.g., the distance in the coordinate system from (–3, –4) to the center of the left pupil. Angle information may also be incorporated, e.g., the distance and angle to a feature from the challenge coordinate. It will be recognized that this sort of use of biological features as a CRP mechanism may be extended to other objects that have recognizable landmarks, such as irises, retinas, fingerprints and palm prints, all of which are within the scope of this invention as biological objects form which biometric prints may be generated.

Figure 9:
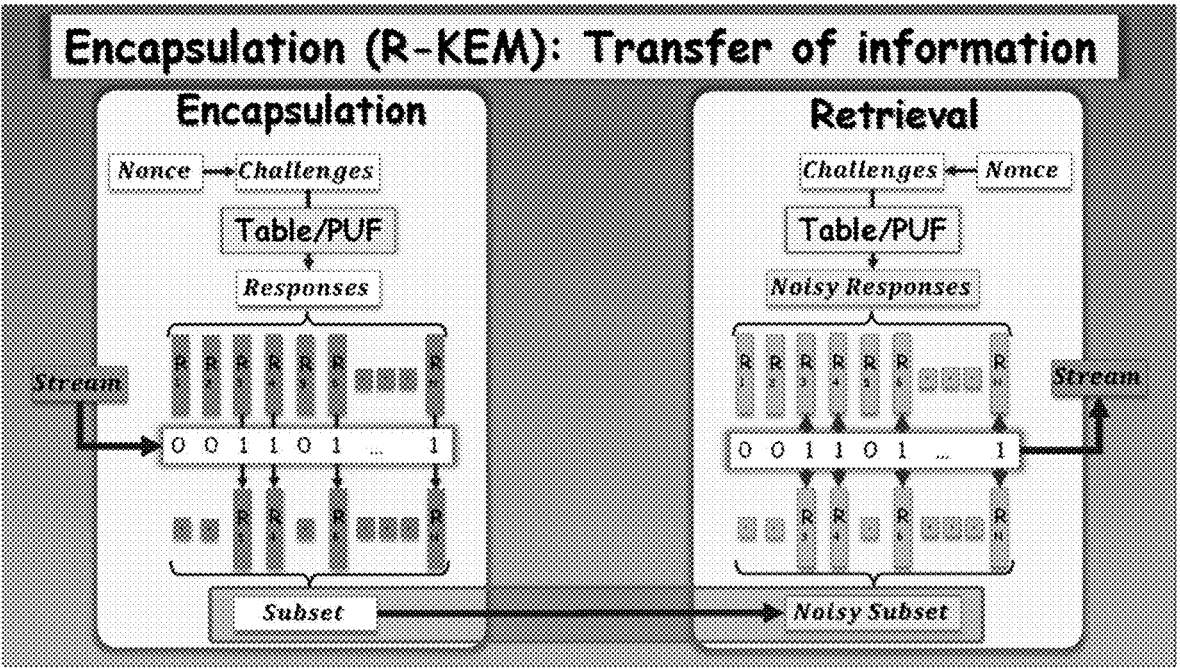
FIGS. 9-11 are a detailed example showing how inventive methods can be used for the secure storage and recovery of digital files.
Figure 10:
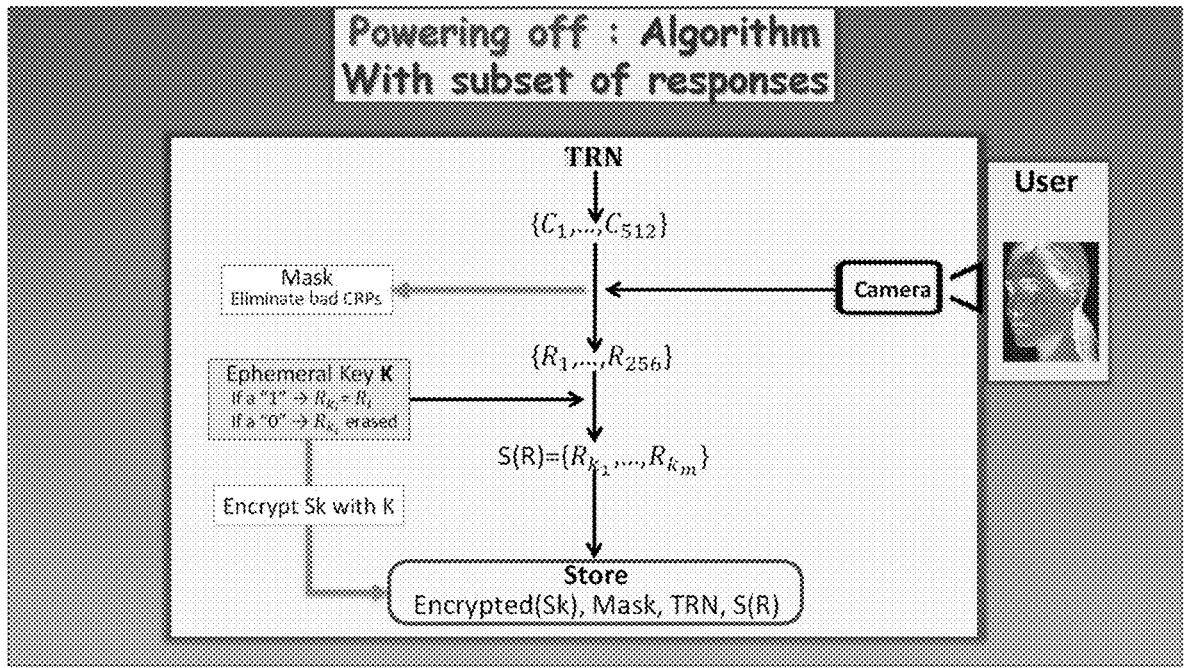
Figure 11:
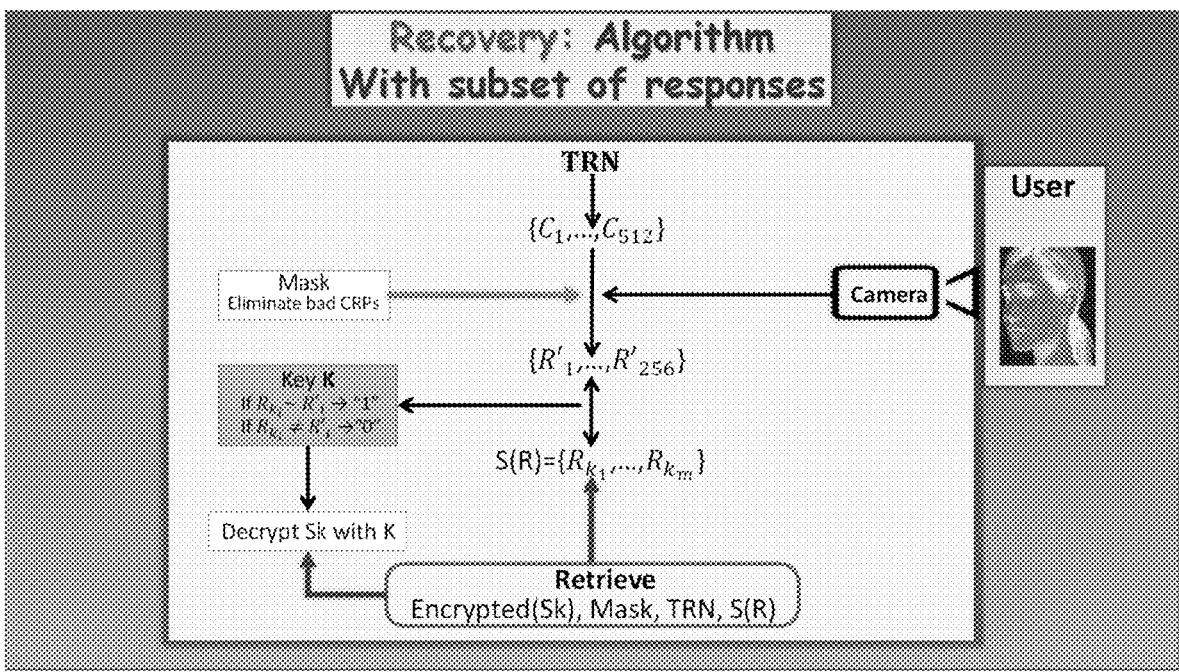

FIG. 9 illustrates in some detail a process for selecting a subset of measured responses to encode the positions of a first binary symbol (e.g., the 1s) in a key K. As seen under "encapsulation", a full set of responses is measured. This set is an ordered sequence, with a first response at a first position, a second response in a second position, and so on. A key is generated of the same length as the number of responses in the full set. The key also, obviously, has a first binary symbol (e.g., 1s) at some positions and a second binary symbol (e.g., 0s) at the remaining positions. By selecting a subset of responses within the full set that have positions having the same positions as the is in K, the position of those ones in K can be recovered by a party capable of generating the full response set (or something reasonably close), and who knows the number of responses in the full response set. This fact enables the generation and use of ephemeral keys, K, which can be deleted after use, and then recovered later. All that is required is storage of the response subset, and the ability to regenerate the full response set later. As is shown in FIGS. 10 and 11, the ephemeral key K may be used for any advantageous purpose, such as encrypting communications, authentication and encryption and decryption of digital files, which themselves may be encryption keys.

While the aforementioned systems and methods have been described in reference to CRP mechanisms built from biological objects, the invention is not so limited. The methods described herein of encoding the 1 positions in a cryptographic key in stored responses of a CRP mechanism are equally applicable to any CRP mechanism or one-way function, including non-biological physical CRP mechanisms, PUFs or even purely mathematical CRP mechanisms like hash functions and those described in U.S. Provisional Patent Application No. 63/459,938 entitled "Protocols with Noisy Response-Based Cryptographic Subkeys," filed on Apr. 17, 2024, the entirety of which is incorporated herein by reference.

It should be understood that, unless explicitly stated or otherwise required, the features disclosed in embodiments explicitly described herein and elsewhere in this disclosure may be used in any suitable combinations. Other embodiments and uses of the above inventions will be apparent to those having ordinary skill in the art upon consideration of the specification and practice of the invention disclosed herein. It should be understood that features listed and described in one embodiment may be used in other embodiments unless specifically stated otherwise. The specification and examples given should be considered exemplary only, and it is contemplated that the appended claims will cover any other such embodiments or modifications as fall within the true scope of the invention.

The invention claimed is:

1. A method of generating and sharing a cryptographic key between a client and a server device, comprising:
executing an enrollment procedure comprising:
generating a sequence of seeds;
deriving, from the sequence of seeds, a first ordered sequence of n challenges specifying measurement instructions for a biometric print;
making a first biometric print of a biological object, and measuring the first biometric print in accordance with the first ordered sequence of n challenges resulting in a first ordered sequence of n responses;
storing the sequence of seeds at each of the client and server devices, and storing the ordered sequence of n responses at the server device; and
executing a key exchange procedure comprising:
deriving, from the sequence of seeds, the first ordered sequence of n challenges;
making a second biometric print of the biological object, and measuring the second biometric print in accordance with the ordered sequence of n challenge instructions resulting in a second ordered sequence of n responses;
generating a binary first key of n bit length;
selecting, within the second ordered sequence of n responses those responses having a position in the sequence corresponding to the positions of a first binary symbol in the first key, resulting in m responses;
sending the m responses to the server;
comparing each of the m responses to each response in the first ordered sequence of n responses to determine matches;
generating a second binary key of n bit length by:
on the basis of the comparison, determining positions of responses in the first ordered sequence of n responses that match responses in the subset of m responses, assigning the first binary symbol to those positions, and assigning a second binary symbol to the remaining positions.

2. The method of claim 1, wherein generating the sequence of seeds comprises generating n seeds with a random number generator.

3. The method of claim 2, wherein generating the sequence of seeds further comprises generating the sequence of seeds with a user supplied password.

4. The method of claim 1, wherein the biological object is a human face.

5. The method of claim 4, wherein the biological object is the face of the user of the terminal device.

6. The method of claim 4, wherein the first and second biometric prints are images of the face.

7. The method of claim 6, wherein the first ordered sequence of n challenges specifying measurement instructions for a biometric print specify instructions for measuring a distance from one or more points in a coordinate space to one or more facial landmarks.

8. The method of claim 1, wherein the biological object is one of a finger, palm, iris, or retina.

9. The method of claim 1, wherein generating a binary first key of n bit length comprises generating a binary first key of n bit length with a random number generator.

10. The method of claim 1, wherein the first the first binary symbol is a 1.

11. The method of claim 1, wherein deriving, from the sequence of seeds, a first ordered sequence of n challenges specifying measurement instructions for a biometric print comprises hashing each seed in the sequence with a password.

12. The method of claim 1, wherein comparing each of the m responses to each response in the first ordered sequence of n responses to determine matches comprises computing a Hamming distance between each of the m responses and each response in the first ordered sequence of n responses and determining a match when the Hamming distance is below a predetermined threshold.

13. The method of claim 1, wherein making the first and second biometric print of the biological object comprises taking an image of the biological object with a camera at the terminal device.

* * * * *